United States Patent [19]

Pullela

[11] Patent Number: 5,363,501
[45] Date of Patent: Nov. 8, 1994

[54] METHOD FOR COMPUTER SYSTEM DEVELOPMENT VERIFICATION AND TESTING USING PORTABLE DIAGNOSTIC/TESTING PROGRAMS

[75] Inventor: Somayajulu S. K. Pullela, Campbell, Calif.

[73] Assignee: Sony Electronics, Inc., Park Ridge, N.J.

[21] Appl. No.: 995,587

[22] Filed: Dec. 22, 1992

[51] Int. Cl.$^5$ .................. G06F 9/455; G06F 15/16
[52] U.S. Cl. .................. 395/500; 395/575; 371/16.2; 371/19
[58] Field of Search ........... 395/500, 575; 371/19, 371/16.2

[56] References Cited

U.S. PATENT DOCUMENTS

| | | | |
|---|---|---|---|
| 4,084,235 | 4/1978 | Hirtle et al. | 395/500 |
| 4,312,066 | 1/1982 | Bantz et al. | 371/16.1 |
| 4,827,404 | 5/1989 | Barstow et al. | 395/500 |
| 4,899,306 | 2/1990 | Greer | 395/500 |
| 5,022,028 | 6/1991 | Edmonds et al. | 371/19 |
| 5,045,994 | 9/1991 | Belfer et al. | 395/500 |
| 5,157,782 | 10/1992 | Turttle et al. | 395/575 |
| 5,249,299 | 9/1993 | Iwata | 395/800 |

*Primary Examiner*—Parshotam S. Lall
*Assistant Examiner*—Krisna Lim
*Attorney, Agent, or Firm*—Irell & Manella

[57] ABSTRACT

A method for executing diagnostic/testing programs written directly for a computer to be tested. In the preferred embodiment, the operation of the computer to be tested is simulated by a simulation computer and the diagnostic/testing programs are executed on a native computer. The native computer provides messages to the simulation computer indicating operations the diagnostic/testing program attempted to perform on the native computer. The simulation computer receives the messages and executes the operations indicated by the messages. The simulation computer generates response messages indicating the steps the computer to be tested would have executed, such as a direct memory access (DMA read/write), in response to the operations the diagnostic/testing program attempted to perform on the native computer. The response messages are provided to the native computer, which executes the steps contained in the reply messages. The results of the steps executed by the native computer are the desired diagnostic/testing results. Since the diagnostic/testing program is not executed directly by the simulation computer, the diagnostic/testing program need not be tailored to a particular simulation computer.

7 Claims, 4 Drawing Sheets

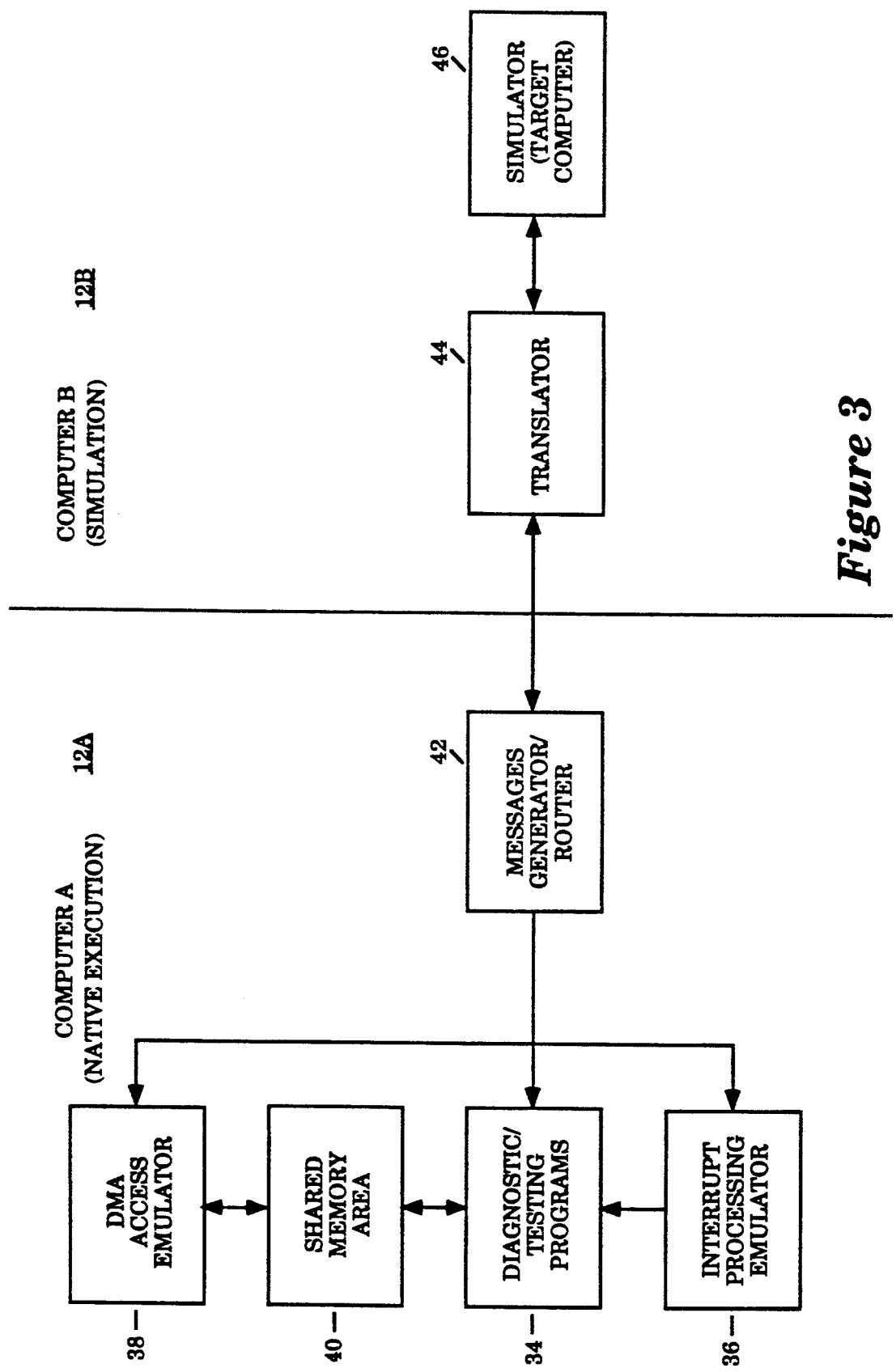

METHOD FOR COMPUTER SYSTEM DEVELOPMENT VERIFICATION AND TESTING USING PORTABLE DIAGNOSTIC/TESTING PROGRAMS

BACKGROUND OF THE INVENTION

1. Field of the Invention

The present invention relates to the field of computer systems. More specifically, the present invention relates to computer system development, verification and testing.

2. Background

Today, computer systems are often designed and developed using a variety of software tools. These software tools often include diagnostic/testing programs that verify and test the functionality, and simulators that simulate the operation, of the computer systems being developed. The diagnostic/testing programs are executed using the simulators. Since a simulator simulates the operation of a computer system, it is necessary that the simulator be specifically implemented for the particular computer system. Generally, except for unique functions, it is not necessary for the diagnostic/testing programs to be specifically implemented for a computer system. Nevertheless, because diagnostic/testing programs are often designed to interface directly with a particular simulator, as a result, they are often tightly coupled to a particular specifically implemented simulator. The diagnostic/testing programs would be tailored to a specific protocol for providing inputs representative of hardware signals to the simulator, a specific manner of synchronizing their own execution with the specific manner hardware signal processing are simulated by the simulator, and a specific protocol for receiving outputs representative of the replying hardware signals presented by the simulator. Thus, it is often difficult to port the diagnostic/testing programs used for the development of one computer system, and reuse them for the development of another computer system.

Additionally, due to the extensive nature of a computer system and the overhead required to execute code to simulate the same, computer-based simulation is inherently slow. Thus, the execution of these traditional diagnostic/testing programs that are tightly coupled to a particular simulation is also inevitably slow.

SUMMARY OF THE INVENTION

It is therefore the objects of the present invention to enhance the portability and improve the execution speed of diagnostic/testing programs for computer system development, verification and testing. It is another object of the present invention to achieve the objects of enhanced portability and improved execution speed of the diagnostic/testing programs with virtually no modification to the simulator of a computer system being developed. It is another object of the present invention to achieve the above stated objects without requiring special purpose hardware.

The objects of the present invention are advantageously achieved by providing a message generator/router, a direct memory access (DMA) emulator, an interrupt emulator, and a shared memory area on a first computer system (also referred to as a native execution computer system), and a translator on a second computer system (also referred to as a simulation computer system). The operating system of the native execution computer system provides system services for trapping various program execution exceptions and providing information on the causes of the exceptions. The diagnostic/testing programs for verifying and testing a third computer system, i.e. the target computer system being developed, and the simulator that simulates the operation of the target computer system, are executed on the native execution and the simulation computer system respectively. Together these elements cooperate to provide an execution environment for the diagnostic/testing programs that enables the enhancement of their portability and the improvement of their execution speed.

The diagnostic/testing programs are advantageously implemented as if they are going to be executed directly on the target computer system without using a simulator. As these diagnostic/testing programs are executed on the native execution computer system, an execution exception will be trapped by the operating system of the native execution computer system, whenever the diagnostic/testing programs reference a resource of the simulated target computer system, i.e. a register, a memory location etc., since the resources of the simulated target computer system are not recognized by the operating system of the native execution computer system. For the purpose of this invention, these references to the resources of the simulated target computer system are divided into two categories. The first category comprises references resulting from execution of instructions that involve CPU read/write operations to registers and memory locations on the simulated target computer system. The second category comprises references resulting from execution of instructions that involve input/output (I/O) direct memory access (DMA) read/write operations to memory locations on the simulated target computer system.

The message generator/router detects the traps of execution exceptions caused by the diagnostic/testing programs by the operating system, and in response, generates and sends messages with the appropriate contents to the translator. The message generator/router subsequently receives reply messages from the translator and routes them to the diagnostic/testing programs, the DMA and interrupt emulators according to the content of the reply messages. The DMA and interrupt emulators emulate the effect of DMA accesses and interrupts on the simulated target computer system respectively.

The translator receives messages from the message generator/router, and in response, translates and sends corresponding inputs representative of hardware signals to the simulator. The translator subsequently receives outputs representative of reply hardware signals from the simulator, and in response, translates and sends reply messages to the message generator/router.

Thus, whenever a trap of an execution exception caused by the diagnostic/testing programs referencing a resource of the simulated target computer system is detected, a message with the appropriate information is sent by the message generator/router to the translator, which in turn causes inputs representative of hardware signals to be provided to the simulator. The simulator simulates processing of the hardware signals by the target computer system. Upon simulated processing of the hardware signals, outputs representative of reply hardware signals are provided by the simulator to the translator, which in turn causes a message with the appropriate content to be provided to the message generator/router. The reply message is in turn provided to either the diagnostic/testing programs or one of the two emulators according to its content.

As a result of the diagnostic/testing programs being implemented as if they are going to be executed directly on the target computer system without the simulator, the diagnostic/testing programs are not tightly coupled to the simulator, thereby enhancing their portability and reusability in another development of computer system, as well as improving their execution speed. Furthermore, the enhanced portability and improved execution performance are achieved without requiring modification to the simulator for the computer system being developed.

BRIEF DESCRIPTION OF THE DRAWINGS

The objects, features, and advantages of the present invention will be apparent from the following detailed description with references to the drawings in which:

FIG. 3 illustrates the architecture of the present invention.

DETAILED DESCRIPTION

A portable method and apparatus for performing computer system development, verification and testing is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
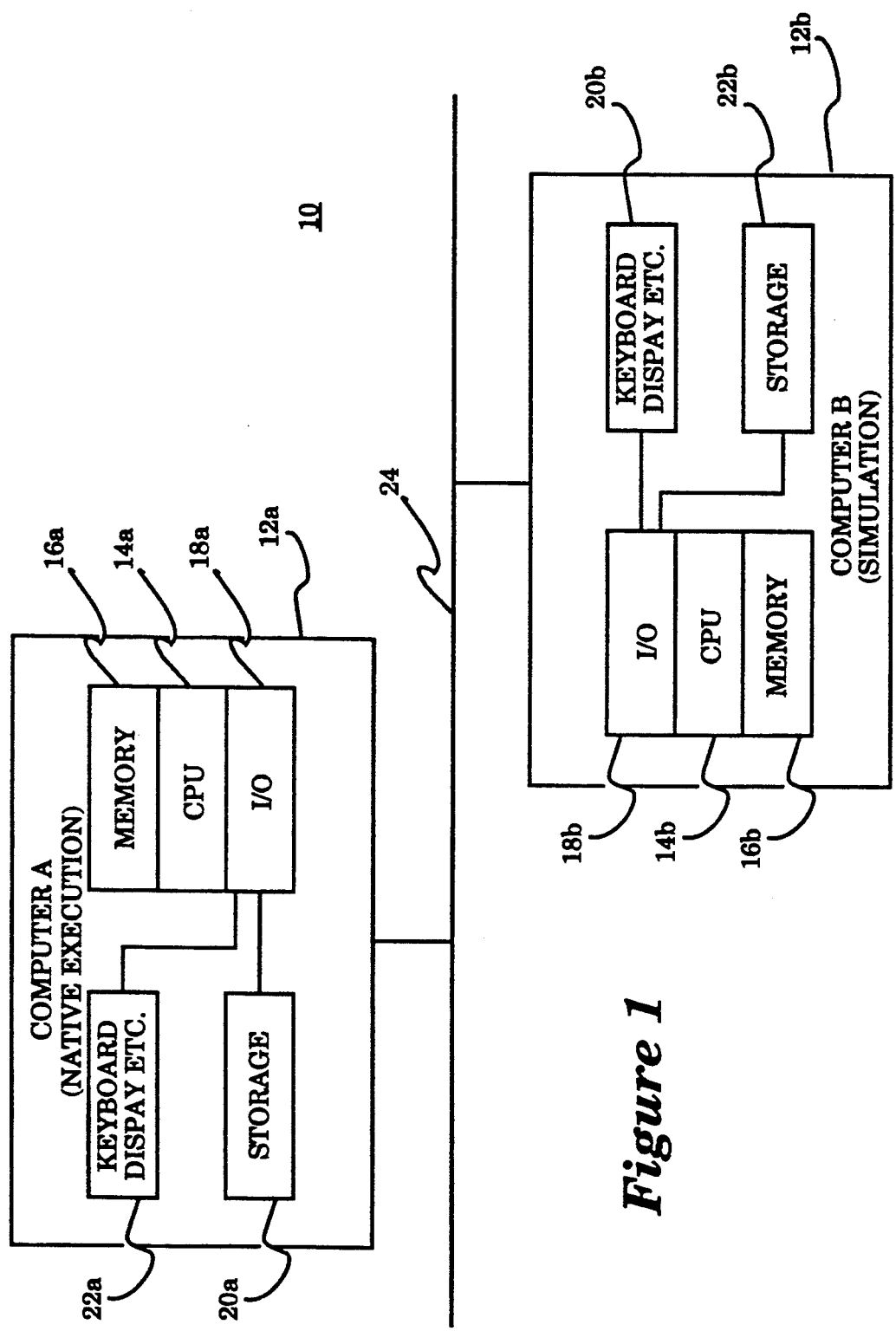
FIG. 1 illustrates a hardware component view of one embodiment of the present invention for performing computer system development, verification and testing.

Referring now to FIG. 1, a block diagram illustrating a hardware view of one embodiment of the present invention is shown. Shown are two computer systems A and B, 12a and 12b, a native execution computer system and a simulation computer system, embodied with the teachings of the present invention. The two computer systems A and B, 12a and 12b, are coupled to each other, for example, through a network 24. Each computer system, 12a, 12b, comprises a central processing unit (CPU), 14a, 14b, a memory unit, 16a, 16b, and an I/O interface unit, 18a, 18b. Additionally, each computer system, 12a, 12b, comprises a storage unit, 20a, 20b, and a number of input/output devices, such as keyboard and display, 22a, 22b. Preferably, the computer systems, 12a, 12b, and the connecting network 24, are intended to represent a broad category of general purpose and special purpose computers and networks, which are well known in the art. Although the system of the present invention is being described with in the context of two computer systems, based on the descriptions to follow, it will be appreciated that the present invention may be practiced using one or more computer systems.

Figure 2:
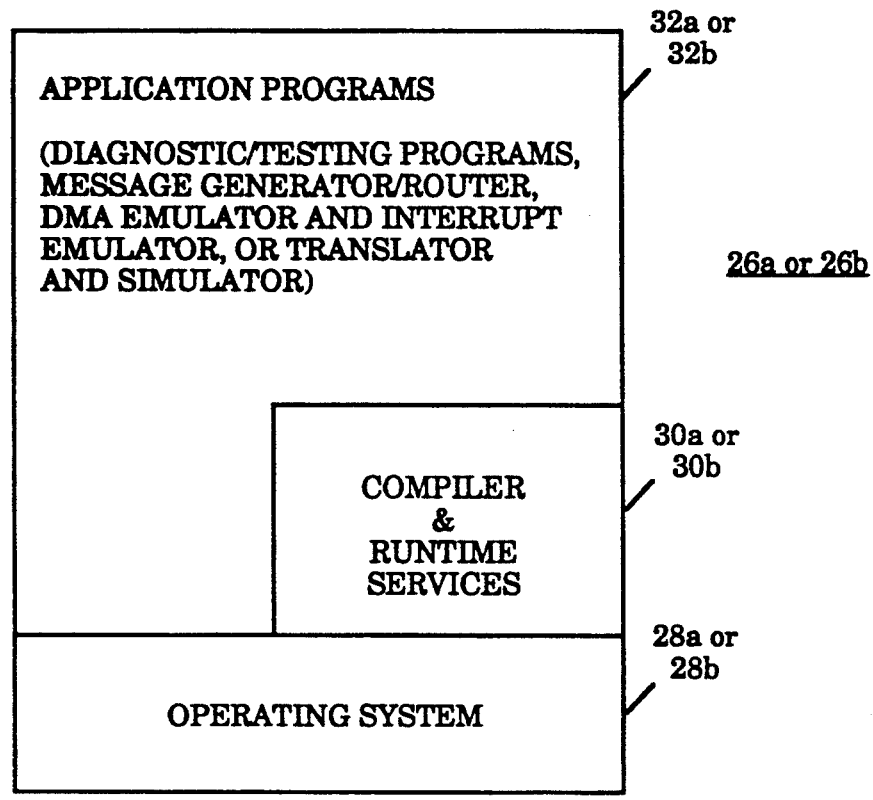
FIG. 2 illustrates a software component view of the computers of FIG. 1.

Referring now to FIG. 2, a block diagram illustrating a software component view of the computer systems of FIG. 1 is shown. Each computer system comprises an operating system, 28a, 28b, for managing the resources of the computer system. In particular, the operating system of the native execution computer system 28a comprises system services for trapping vadous program execution exceptions, and providing information on the causes of these trapped execution exceptions. Additionally, each computer system comprises various programming language compilers and their runtime services, 30a, 30b, and various application programs, 32a, 32b, incorporated with the teachings of the present invention. In particular, the application programs 32a of the native execution computer system comprise various diagnostic/testing programs for diagnosing and testing a third computer system (not shown), i.e. the target computer under development, an interrupt emulator for emulating the effect of interrupt on the simulated target computer system, a direct memory access (DMA) emulator for emulating the effect of DMAs on the simulated target computer system, and a message generator/router for detecting certain types of trapped execution exceptions, generating, receiving and routing messages. The application programs 32b of the simulation computer system comprise a simulator for simulating hardware signal processing on the target computer system, and a translator for translating messages to simulator inputs representative of hardware signals and simulator outputs representative of hardware signals to reply messages.

Except for the manner in which they are used to cooperate with other elements of the present invention, the operating system, 28a, 28b, and the various programming language compilers and their runtime services, 30a, 30b, are intended to represent a broad category of well known operating systems, programming language compilers and their runtime services, including but not limited to the UNIX ® system, and the C compiler and runtime library (UNIX is a registered trademark of UNIX System Laboratory), which are well known in the art. Similarly, the simulator is intended to represent a broad category of simulators used to simulate operation of computer systems, which are well known in the art. The diagnostic/testing programs, the message generator/router, the interrupt emulator, the DMA emulator, the translator, and the way these elements cooperate with the simulator, will be described in further detail below with references to the remaining figures.

Referring now to FIG. 3, a block diagram illustrating the architecture of the present invention as implemented in the embodiment of FIG. 1 is shown. The diagnostic/testing programs 34, the two emulators 36 and 38, and the message generator/router 42 are executed on the native execution computer 12a. In particular, the diagnostic/testing programs 34 and the DMA emulator 36 are provided access to a shared memory area 40. Furthermore, the operating system of the native execution computer 12a comprises the system services for trapping program execution exceptions and providing information on the causes of the trapped exceptions. The translator 44 and the simulator 46 are executed on the simulation computer 12b. The allocation of program execution on the two computers, 12a and 12b, is strictly a function of execution performance and load balancing. Based on the remaining description to follow, it will be appreciated that the present invention may be practiced with other program execution allocation provided that the elements will continue to be able to cooperate with each other in accordance to the manner to be described.

The diagnostic/testing programs 34 verify and test the simulated target computer system. However, they are implemented as if they are going to be executed directly on the computer system under development without the use of a simulator. In other words, the diagnostic/testing programs 34 are not tailored to any specific protocol for providing inputs to a simulator, any manner of synchronization with simulated hardware signal processing, nor any specific protocol for receiving outputs from a simulator. Since the resources of the simulated target computer system, i.e, registers, memory locations etc., are not recognized by the operating system of the native execution computer 12a, these diagnostic/testing programs 34 cause the operating system to trap and raise an execution exception every time they reference a resource of the simulated target computer system. For the purpose of the present invention, these resource references are divided into two categories. The first category includes resource references resulting from execution of instructions that cause the CPU of the simulated target computer system to perform read/write operations to registers and memory locations on the simulated target computer system. The second category includes references resulting from execution of instructions that cause input/output (I/O) direct memory access (DMA) read/write operations to memory locations on the computer system under development.

Additionally, the diagnostic/testing programs 34 store DMA write data in the shared memory area 40 before initializing the DMA parameters and starting a DMA write operation on the simulated target computer system. Conversely, the diagnostic/testing programs 34 access the shared memory area 40 for DMA read data after initializing the DMA parameters and starting a DMA read operation on the simulated target computer system.

The message generator/router 42 detects the traps of execution exceptions caused by the diagnostic/testing programs 34, and in response, generates and sends messages to the translator 44. The messages include all relevant information such as the particular resources of the simulated target computer system being referenced and the operations making these references. The message generator/router 42 subsequently receives reply messages from the translator 44 and routes them to the diagnostic/testing programs 34, the DMA and interrupt emulators, 36 and 38, according to their contents. While the message generator/router 42 is being described as a single combined function module, it will be appreciated that the present invention may be practiced with the functions of the message generator/router distributed into multiple function modules.

The DMA and interrupt emulators, 36 and 38, emulate the effect of DMA accesses and interrupts on the simulated target computer system respectively. In particular, the DMA emulator 36 transfers the DMA write data stored in the shared memory area 40 by the diagnostic/testing programs to the simulator 46, and stores the DMA read data into the shared memory area 40 making them available to the diagnostic/testing programs 34. The interrupt emulator 38 interrupts execution of the diagnostic/testing programs 34 as a result of interrupts being triggered on the simulated target computer system.

The translator 44 receives messages from the message generator/router 42, and in response, translates and provides corresponding inputs representative of hardware signals to the simulator 46. The translator 44 subsequently receives outputs representative of reply hardware signals from the simulator 46, and in response, translates and sends reply messages to the message generator/router 42. The reply messages also include all relevant information, such as the results of the references and interrupts triggered on the simulated target computer system. While the translator 44 is being described as a single combined function module translating messages to simulator inputs representative of hardware signals, and outputs representative of reply hardware signals to reply messages, it will be appreciated that the present invention may be practiced with the functions of the translator distributed into multiple function modules.

Figure 4:
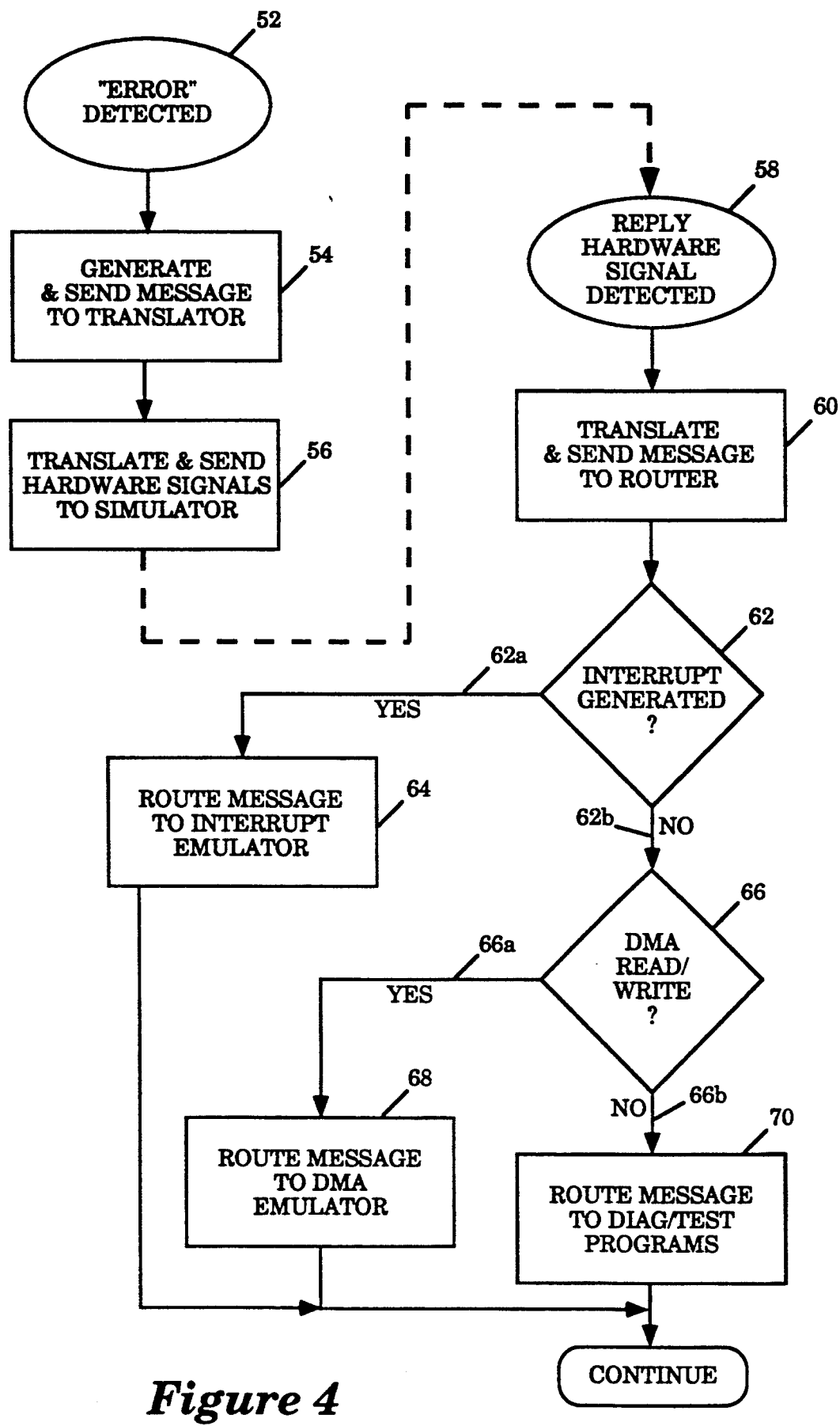
FIG. 4 illustrates the method of the present invention.

Referring now to FIG. 4, a block diagram illustrating the method of the present invention is shown. Whenever the trap of an execution exception caused by the diagnostic/testing programs referencing a resource of the simulated target computer system is detected, block 52, a message with the appropriate information is sent by the message generator/router to the translator, block 54, which in turn causes inputs representative of hardware signals to be provided to the simulator, block 56. The simulator simulates processing of the hardware signals by the target computer system, and issues outputs representative of reply hardware signals.

Upon detection of outputs representative of reply hardware signals from the simulator, a reply message with the appropriate content is provided to the message generator/router, block 60. If content of the reply message indicates that an interrupt is triggered by the simulated processing, branch 62a, the message is routed to the interrupt processing emulator, block 64, which in turn emulates the triggering of an interrupt on the simulated target computer system and interrupts the execution of the diagnostic/testing programs. If the content of the reply message indicates that the original reference to the resource of the simulated target computer system was resulted from execution of an instruction that caused a DMA read/write operation, branch 66a, the message is routed to the DMA emulator, block 68, which in turn either updates the shared memory area making the DMA read data available to the diagnostic/testing programs, or transfers the DMA write data from the shared memory area to the simulator through the message generator/router and the translator. The reply message issued by the translator includes the returning DMA read data outputted by the simulator in the case of a resulted DMA read operation, If the content of the reply message indicates that the original reference to the resource of the simulated target computer system was resulted from execution of an instruction that caused a CPU read/write operation, branch 66b, the message is routed to the diagnostic/testing programs, block 74. The reply message issued by the translator includes the returning data outputted by the simulator in the case of a resulted CPU read operation.

Figure 5:
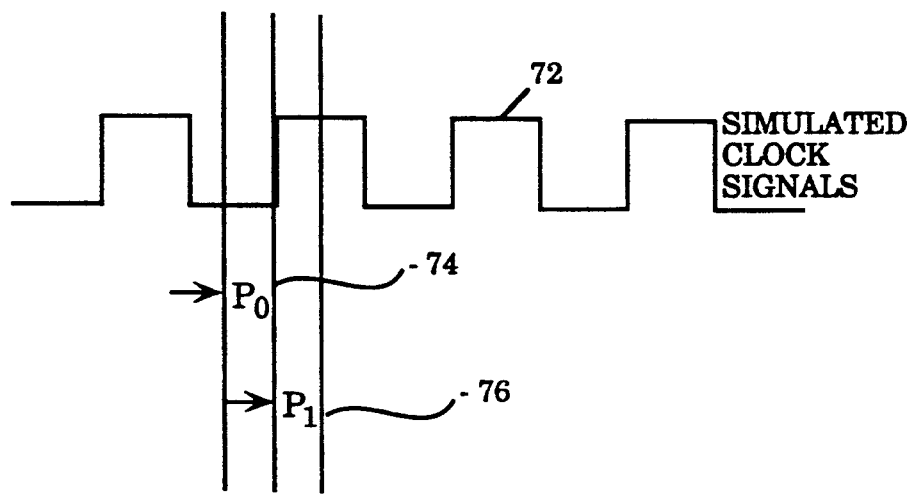
FIG. 5 illustrates the timing relationship between the translator and the simulator of FIG. 3.

Referring back to FIG. 3, the inter-program communication between the diagnostic/testing programs 34, the two emulators, 36 and 38, and the message generator/router 42 may be implemented with any one of a variety of well known inter-program communication protocols. Similarly, the remote inter-program communication between the message generator/router 42 and the translator 44 may be implemented with any one of a variety of well known remote inter-program communication protocols. Likewise, the exchange of hardware signals between the translator 44 and the simulator 46 may be implemented with a variety of well known bus models or software protocols. However, it will be appreciated that because the translator 44 translates in a sequential manner and the simulator 46 is event driven, the exchange of inputs/outputs representative of hardware signals between the translator 44 and the simulator 46 is timing sensitive. This timing requirement is illustrated in FIG. 5. The inputs representative of hardware signals are delivered from the translator to the simulator immediately after the rising edge of the simulated clock pulse, period pl, 76. Conversely, the outputs representative of hardware signals are delivered from the simulator to the translator just before the rising edge of the simulated clock pulse, period p0, 74, so that the translator receives the outputs representative of the reply hardware signals while the relevant data in the translator is still in the prior state.

Thus, it will be appreciated that as a result of the diagnostic/testing programs being implemented as if they are going to be executed directly on the computer system under development, the diagnostic/testing programs are not tightly coupled to the simulator, thereby enhancing their portability to other development of computer system, as well as improving their execution performance. Furthermore, the enhanced portability and improved execution performance are achieved without requiring modification to the simulator.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system apparatus comprising at least one computer for diagnostic/testing program execution and simulation, a method for performing development, verification and testing of a target computer under development, said method comprising the steps of:
   a) simulating operations of said target computer;
   b) verifying and testing functions of said simulated target computer by said diagnostic/testing program, said verification and testing being performed as if they are performed directly on said target computer;
   c) detecting a plurality of raised exceptions, generating and sending corresponding messages for said detected exceptions, said exceptions being raised when said diagnostic/testing program references hardware elements of said simulated target computer;
   d) receiving said corresponding messages, translating said received messages into corresponding hardware signals formatted for said simulation, said corresponding hardware signals corresponding to said exceptions, and providing said corresponding hardware signals to said simulation;
   e) detecting outputs representative of reply hardware signals from said simulation, translating said detected outputs into corresponding messages formatted for said diagnostic/testing program execution, and sending said corresponding reply messages to said diagnostic/testing program execution;
   f) receiving said corresponding reply messages by said diagnostic/testing program execution, and routing said received reply messages to emulate interrupts, to emulate DMA read/writes or to said diagnostic/testing program in accordance with the contents of said reply messages;
   g) receiving said reply messages that are interrupt related, and emulating interruption of said diagnostic/testing program by said simulated target computer; and
   h) receiving said reply messages that are DMA read/write operation related and emulating DMA read/write operations between said diagnostic/testing program and said simulation;
   said diagnostic/testing program also receiving non-interrupt and non-DMA read/write operation related reply messages.

2. The method as set forth in claim 1, wherein,
   said raised exceptions are program execution exceptions raised by an operating system of said diagnostic/testing program execution and simulation computer, said operating system comprising system services for raising program execution exceptions whenever programs executing on said diagnostic/testing program execution and simulation computer reference hardware elements not recognized by said operating system, and providing information on causes of said raised program execution exceptions;
   said verification and testing being performed on said diagnostic/testing program execution and simulation computer, said diagnostic/testing program referencing hardware elements of said simulated target computer, said hardware elements of said simulated target computer being not recognized by said operating system.

3. The method as set forth in claim 1, wherein, said references to hardware elements of said simulated target computer comprise references resulting from execution of instructions that cause CPU read/ write operations to or from registers and memory locations of said simulated target computer, and references resulted from execution of instructions that cause I/O DMA read/write operations to or from memory locations of said simulated target computer.

4. The method as set forth in claim 1, wherein, said corresponding hardware signals are provided to said simulation immediately after a rising edge of a simulated clock of said simulated target computer.

5. The method as set forth in claim 1, wherein, said outputs representative of reply hardware signals being provided from said simulation immediately before a rising edge of a simulated clock of said simulated target computer.

6. The method as set forth in claim 1, wherein,
   said method further comprises the step g) storing DMA read and write data in a shared memory area;
   said diagnostic/testing program stores DMA write data in said shared memory area before initializing DMA write parameters and starting a DMA write on said simulated target computer, said DMA emulation transferring said stored DMA write data to said simulation through said message generation and said translation of messages to said corresponding hardware signals; and said diagnostic/testing program uses DMA read data stored in said shared memory area after having initialized DMA read parameters and starting a DMA read on said simulated target computer, said DMA emulation storing said DMA read data in said shared memory area upon receiving said DMA read data from said simulation through said translation from outputs representative of hardware signals to reply messages and said messages routing.

7. The method as set forth in claim 1, wherein, said computer system apparatus comprises a computer for diagnostic/testing program execution and another computer for simulation, said diagnostic/testing program execution and said simulation computers being coupled to each other;

said simulation is performed on said simulation computer;

said verification and testing are performed on said diagnostic/testing execution computer;

said message generation is performed on said diagnostic/testing program execution computer;

said translations are performed on said simulation computer;

said message routing is performed on said diagnostic, testing program execution computer; said interrupt emulation is performed on said diagnostic/testing program execution computer; and said DMA emulation is performed on said diagnostic/testing program execution computer.

* * * * *

UNITED STATES PATENT AND TRADEMARK OFFICE
CERTIFICATE OF CORRECTION

PATENT NO. : 5,363,501

DATED : November 8, 1994

INVENTOR(S) : Somayajulu S. K. Pullela

It is certified that error appears in the above-identified patent and that said Letters Patent is hereby corrected as shown below:

```
Cover page: In the title, after "Development" insert --,--.
Column 1, line 20, after "the" delete --.--.
Column 4, line 4, replace "vadous" with --various--.
Column 6, line 53, after "operation" replace "," with --.--.
Column 7, line 67, after "corresponding" insert --reply--.
```

Signed and Sealed this

Tenth Day of October, 1995

Attest:

BRUCE LEHMAN

*Attesting Officer*　　*Commissioner of Patents and Trademarks*